United States Patent
Griffith et al.

(10) Patent No.: US 12,488,171 B2
(45) Date of Patent: Dec. 2, 2025

(54) THROUGH SILICON VIA MACRO WITH DENSE LAYOUT FOR PLACEMENT IN AN INTEGRATED CIRCUIT FLOORPLAN

(71) Applicant: Advanced Micro Devices, Inc., Santa Clara, CA (US)

(72) Inventors: Michael Edward Griffith, Ft. Collins, CO (US); Aaron Keiichi Horiuchi, Ft. Collins, CO (US); Donald A. Clay, Boxborough, MA (US); Eric William Busta, Ft. Collins, CO (US); Hye Jung Stanford, Austin, TX (US); Kathryn E. Wilcox, Boxborough, MA (US); Ruochen Xie, Shanghai (CN); Russell Schreiber, Austin, TX (US); Stephen J. Dussinger, Ft. Collins, CO (US); William Edwin Laub, Jr., Boxborough, MA (US); Te-Hsuan Chen, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 716 days.

(21) Appl. No.: 17/854,516

(22) Filed: Jun. 30, 2022

(65) Prior Publication Data
US 2024/0005078 A1    Jan. 4, 2024

(51) Int. Cl.
*G06F 30/392* (2020.01)
*G06F 30/398* (2020.01)

(52) U.S. Cl.
CPC .......... *G06F 30/392* (2020.01); *G06F 30/398* (2020.01)

(58) Field of Classification Search
CPC ...... G06F 30/39; G06F 30/392; G06F 30/398; G06F 2111/20; G06F 2119/22; G06F 30/394; H10D 89/10

(Continued)

(56) References Cited

U.S. PATENT DOCUMENTS

2012/0304142 A1*  11/2012  Morimoto ............. G06F 30/398
                                                         716/119
2019/0019742 A1    1/2019  Lee et al.
(Continued)

FOREIGN PATENT DOCUMENTS

CN   109256370 A    1/2019
KR   20190007574 A  1/2019
(Continued)

OTHER PUBLICATIONS

Dae Hyun Kim et al.: "Study of Through-Silicon-Via Impact on the 3-D Stacked IC Layout", IEEE Transactions on very large scale Integration Systems, vol. 21 No. 5, May 1, 2013, pp. 862-974.

(Continued)

*Primary Examiner* — Paul Dinh
(74) *Attorney, Agent, or Firm* — Kowert, Hood, Munyon, Rankin & Goetzel, P.C.; Rory D. Rankin (57) ABSTRACT

A system and method for efficiently designing a through silicon via (TSV) macro blocks are described. In various implementations, the circuitry of a processor executes instructions of a place and route tool that provides automatic placement of macro blocks and standard cells on an integrated circuit die based on a copy of a netlist of the integrated circuit being designed and a copy of a standard cell library that includes a variety of standard cells and macro blocks. The processor places two functional macros in the floorplan with a channel between them. In the channel, the processor places a TSV macro that includes at least one boundary cell inside of the TSV macro. The processor prevents placement of a boundary cell adjacent to at least one side of the TSV macro despite empty space exists due to no standard cells or macros about the at least one side.

20 Claims, 8 Drawing Sheets

(58) Field of Classification Search
USPC .......................................................... 716/119
See application file for complete search history.

(56) References Cited

U.S. PATENT DOCUMENTS

2019/0384884 A1* 12/2019 Thuries ................. G06F 30/398
2021/0042461 A1   2/2021 Hu et al.
2024/0371830 A1* 11/2024 Park ...................... G06F 30/392

FOREIGN PATENT DOCUMENTS

SG   10201803447 T   2/2019
TW      202107329 A   2/2021

OTHER PUBLICATIONS

Lu Tiantao et al.: "TSV-Based 3-D ICs: Design Methods and Tools", IEEE Transactions on Computer-Aided Design of Integrated Circuits and Systems, vol. 36, No. 10, Oct. 1, 2017, pp. 1593-1619.
International Search Report and Written Opinion for International Application No. PCT/US2023/022084, mailed Jul. 14, 2023.

* cited by examiner

THROUGH SILICON VIA MACRO WITH DENSE LAYOUT FOR PLACEMENT IN AN INTEGRATED CIRCUIT FLOORPLAN

BACKGROUND

Description of the Relevant Art

A floorplan of a semiconductor die (or die) is a graphical representation of the partitioning of the die. The partitioning uses shapes, such as rectangles, to represent the placement of multiple components such as one or more processing units, one or more blocks of memory, one or more interface units, and so forth. The components are often referred to as macro blocks or macros. The shapes used for the floorplan have dimensions of the macro blocks they represent. The dimensions of the shapes have limits in order to place all of the components on the same die. The limits are set by various factors such as placement of standard cells from a standard library such as boundary cells. Boundary cells do not include active devices, such as transistors, but include multiple base layers and one or more metal layers that do not connect to a power supply. The boundary cells improve semiconductor manufacturability and increase yield. Other examples of factors that limit floorplan dimensions are an area for bonding pads, input/output (I/O) line drivers for signals corresponding to the bonding pads, timing constraints of the macro blocks, predefined rectangles for the at least one processing unit and other intellectual property blocks (IP blocks), and reserved areas. Some examples of reserved areas are areas for routing and buffering clock signals, as well as data and control signals across the die.

An additional example of the reserved areas are areas used for the combination of through silicon vias (TSVs) and their corresponding keep out zones. The TSVs are used as interconnects between dies of three-dimensional integrated circuits (3D ICs) that include two or more layers of active electronic components integrated both vertically and horizontally into a single circuit. Each of a first die, such as a host die or a base die, and at least one other die is used in 3D packaging for a computing system. This type of packaging is referred to as a System in Package (SiP). Typically, the dimensions of the TSV and the corresponding keep out zone are significantly smaller than the minimum TSV pitch. Therefore, the resulting TSV macro block consumes a significant amount of empty space on the die and the corresponding floorplan.

A channel exists between two macro blocks, such as two memory macro blocks, that includes a column of TSVs for transporting power supply signals. A first macro block has boundary cells placed at its side in the channel. A TSV macro block is placed in the channel to be used for transporting power supply voltages or a ground reference voltage. This TSV macro block has boundary cells placed on each of its four sides. A second macro block also has boundary cells placed at its side in the channel. Therefore, along a channel dimension, there needs to be sufficient minimum width to allow the placement of two boundary cells for the macro blocks, the placement of two boundary cells for the TSV macro block, and the placement of the TSV macro block. If the minimum width is not present in the floorplan, then the necessary components do not fit on the same die. Accordingly, significant redesign is required along with possible moving or shifting of macro blocks in the floorplan. Such redesign consumes an appreciable amount of design time, which delays product releases.

In view of the above, efficient methods and systems for efficiently designing a through silicon via macro block are desired.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems and methods for efficiently designing a through silicon via macro block are contemplated. As disclosed herein, a computing device used by the user includes hardware, such as circuitry of a processor, to execute instructions (e.g., a place and route tool or other tool) that provides automatic placement of macro blocks and standard cells on a die. The instructions use a copy of a netlist of an integrated circuit and a standard cell library that includes a variety of standard cells and macro blocks. As used herein, the term "automatic generation" or "automatically generating" refers to having the ability to perform generation, or perform generating steps, without user intervention. Similarly, as used herein, the term "automatic placement" or "automatically placing" refers to having the ability to perform placement, or perform placing steps, without user intervention. For example, when the processor of the computing device executes the instructions of the tool, the processor automatically selects locations for placement of components and routing of signals between the components. In other words, based on the netlist of the integrated circuit being designed and access of a standard cell library, when executing the instructions of the place and route tool, the processor generates data indicative of a placement of the components in a floorplan of the die of the integrated circuit being designed. Similarly, when the processor of the computing device executes the instructions of the place and route tool, the processor prevents automatic placement of particular components, such as boundary cells, in the floorplan of the die that can be automatically placed. In other words, the processor generates data indicative of locations in the floorplan of the die where these particular components are not permitted. This data blocks areas of the die from having these particular components placed.

When the processor of the computing device executes the instructions of the place and route tool, the processor places (or automatically places) two functional macro blocks, such as two memory macro blocks, in a floorplan of the integrated circuit. In other words, the processor generates data indicative of a placement of the two memory macro blocks in the floorplan of the die of the integrated circuit being designed. The two functional macro blocks have a channel between them. The processor places a column of through silicon via (TSV) macro blocks (or macros) in the channel for transporting power supply voltages or ground reference voltages to one or more of the two functional macros. Typically, the TSV macros are placed at a particular distance from the two macros based on a predetermined power grid design for the floorplan. When creating the column of TSV macros in the channel, the processor places a first type of TSV macro. In various implementations, the first type of TSV macro includes at least one boundary cell inside of the TSV macro. In an implementation, the first type of TSV macro includes a first boundary cell on a first side and a second boundary cell on a second side different from the first side, where each of the first side and the second side is located within the TSV macro along a given dimension of the floorplan. One example of the given dimension is a horizontal dimension or an x-dimension of the floorplan.

The processor also places at least one boundary cell adjacent to a first functional macro of the two functional macros. For example, the processor places the boundary cell on a side of the first functional macro in the channel along the given dimension of the floorplan such as the x-dimension of the floorplan. Typically, boundary cells are placed around one or more sides of a macro to fill empty space on the die between a pair of macros, between a pair of a macro and a standard cell, or between a macro and an edge of the die. The boundary cells improve semiconductor manufacturability and increase yield. However, the processor prevents placement in the floorplan of a boundary cell adjacent to at least one side of the first type of TSV macro. In other words, the processor generates data indicative of a location in the floorplan where the boundary cell adjacent to at least one side of the first type of TSV macro is not permitted. In an implementation, the data includes identification of the first type of TSV macro and the one side. In another implementation, the data includes a boundary that includes an area of the one side of the first type of TSV macro. When executing the instructions of the place and route tool, and the processor reaches a step of automatically placing boundary cells around macros, the processor uses the data indicative of prevented placement of the boundary cell to prevent placement of a boundary cell adjacent to at least one side of the first type of TSV macro. In some implementations, the processor prevents placement in the floorplan of a boundary cell adjacent to the first side and the second side of the first type of TSV macro. In such implementations, the first type of TSV macro includes boundary cells within it on the first side and the second side. The use of the first type of TSV macro reduces the required distance between the two functional macros.

In an implementation, the standard cell library includes a second type of TSV macro that has the same dimensions as the first type of TSV macro. However, boundary cells are absent from the second type of TSV macro. Therefore, when selecting and placing the second type of TSV, the processor also places boundary cells around the sides of the second type of TSV macro. In some implementations, the processor selects and places the first type of TSV macro between two functional macros when the distance between the two functional macros is less than a threshold distance. The processor selects and places the second type of TSV macro between two functional macros when the distance between the two functional macros is greater than or equal to the threshold distance.

Figure 1:
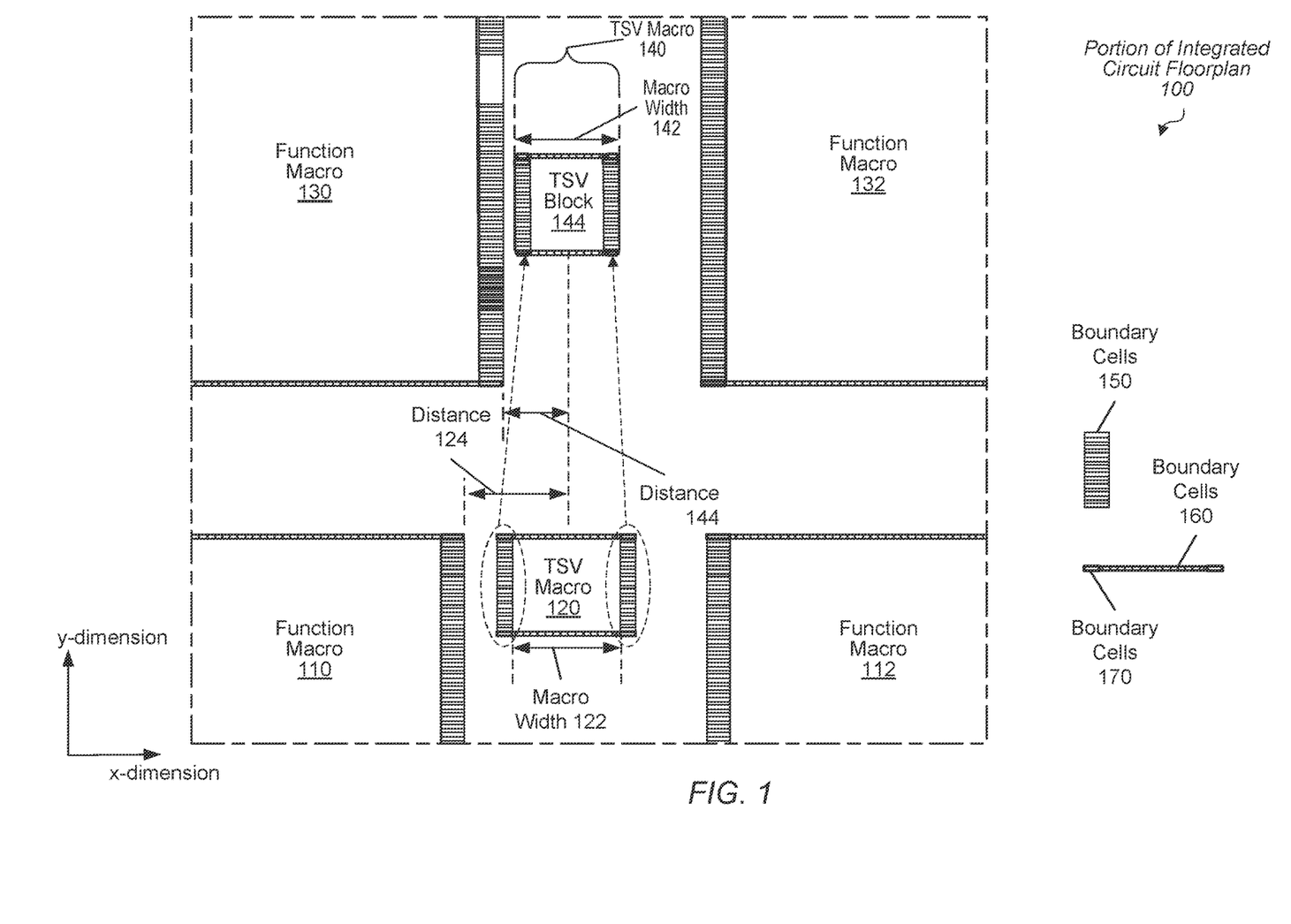
FIG. 1 is a generalized diagram of a portion of a floorplan.

Turning now to FIG. 1, a generalized diagram is shown of a portion 100 of an integrated circuit floorplan. The portion 100 of the integrated circuit floorplan (or floorplan) includes function macros 110, 112, 130 and 132 as well as through silicon via (TSV) macros 120 and 140. The function macros 110, 112, 130 and 132 and the TSV macro 120 have various types of boundary cells 150, 160 and 170 placed adjacent and around them. However, in an implementation, the TSV macro 140 includes boundary cells 150 within the macro and has no boundary cells 150 placed adjacent to it. The TSV macro 140 has boundary cells 160 placed adjacent to a top side and a bottom side in the y-dimension in addition to boundary cells 170 placed adjacent to corners of the TSV macro 140. However, there are no boundary cells 150 placed adjacent to the left side and the right side in the x-dimension of the TSV macro 140. The TSV 140 includes boundary cells 150 within the macro in addition to the TSV block 144 that includes the through silicon via, a corresponding keep out region, a guard ring, and a fill layer. The portion 100 of the floorplan relies on standard cells and individual Boolean gate cells. A standard cell library includes multiple versions of individual Boolean gate cells with varying available transistors sizes. The cells in the standard cell library use active devices. Examples of active devices are one or more of n-type and p-type planar transistors and n-type and p-type non-planar transistors.

As used herein, a "standard cell" is a smallest building block of a standard cell library above cells of individual Boolean gates. Standard cells and individual Boolean gate cells are used to provide functionality of larger design blocks by having copies of the standard cells and Boolean gates instantiated within the larger design blocks followed by a routing step to provide interconnection. In addition to indicating the Boolean functionality and other functionality of the components used within the standard cell, the standard cells also include mask layout data. The mask layout data of a particular standard cell includes one or more mask layers associated with the one or more layers of the particular standard cell. The one or more layers of the particular standard cells include the base layers and the multiple metal layers used for signal interconnect. The mask layout data includes the mask patterns used in photolithography performed during semiconductor fabrication of integrated circuits. The patterns indicate the placement locations of components within the particular standard cell with respect to a reference point such as a certain corner of the particular standard cell. Examples of the components are active devices and passive elements (e.g., resistors, capacitors, inductors) placed in the standard cell. The mask layout data also includes the parasitic information of the components such as the resistance of wires and nodes, coupling capacitance of wires and transistor terminals, and load capacitance.

As described above, standard cells and individual Boolean gate cells are used to provide functionality of larger design blocks by having copies of the standard cells and Boolean gates instantiated within the larger design blocks followed by a routing step to provide interconnection. A copy of a particular larger design block that can be instantiated multiple times in the floorplan is referred to as a "macro block," or simply a "macro." Most macros include active devices for providing functionality. As used herein, these types of macros are also referred to as "function macros." However, the TSV macros 120 and 140 are examples of macros that do not include active devices. In some implementations, each of the function macros 110, 112, 130 and 132 is an instantiation of a same function macro. Accordingly, each of the function macros 110, 112, 130 and 132 provides a same functionality. In an implementation, each of the function macros 110, 112, 130 and 132 is a memory macro that includes static random access memory cells arranged in rows and columns. In other implementations, one or more of the function macros 110, 112, 130 and 132 provide a different functionality than other macros of the function macros 110, 112, 130 and 132. Similar to standard cells, macros, such as the function macros 110, 112, 130 and 132, and the TSV macros 120 and 140 include mask layout data.

Some macros do not include any active devices such as the TSV macros 120 and 140. The TSVs are used as interconnects between dies of three-dimensional integrated circuits (3D ICs) that include two or more layers of active devices integrated both vertically and horizontally into a single circuit. In 3D ICs, each of a first semiconductor die (or die), such as a host die or a base die, and at least one other die is used in three-dimensional (3D) packaging for a computing system. This type of packaging is referred to as a System in Package (SiP). The TSVs are used as interconnects in a SiP between a base die at the bottom of a vertical stack of dies and one or more other dies stacked on top of the base die and one another. When horizontal on-chip signaling is used in a 3D IC, a host die has another die placed horizontally next to the host die, and chip communication uses TSVs within the host die and the other die with an interposer-based integration connection between these TSVs. The printed circuit board is located below the interposer.

Each of the TSV macro 120 and the TSV block 144 includes at least a TSV, a guard ring that indicates the area of a corresponding keep out zone, and a fill layer. Further details of these components are provided later in the upcoming description of the TSV macro 200 (of FIG. 2). In an implementation, the TSV macro 140 includes the boundary cells 150 placed adjacent to the left side and the right side along the x-dimension of the TSV block 144. Similar to other macros, the TSV macro 120 does not include any of the boundary cells 150, 160 and 170. The function macros 110 and 112 have a channel between them where the TSV macro 120 is placed. In an implementation, the TSV macro 120 provides a power supply voltage or a ground reference voltage to one or more of the function macros 110 and 112. Similarly, the function macros 130 and 132 have a channel between them where the TSV macro 140 is placed. In an implementation, the TSV macro 140 provides a power supply voltage or a ground reference voltage to one or more of the function macros 130 and 132.

The TSV macros 120 and 140 are placed in an aligned manner with one another in the y-dimension. In the illustrated implementation, the y-dimension is aligned with the vertical direction. For example, the function macro 130 is placed above the function macro 110 in the vertical direction (or in the y-dimension) in the orientation shown. Similarly, the function macro 112 is placed to the right of the function macro 110 in the horizontal direction (or in the x-dimension) in the orientation shown. The TSV macros 120 and 140 are placed in the vertically aligned manner in the y-dimension according to a power grid specification. Therefore, each of the TSV macros 120 and 140 have a same distance from a center of a corresponding TSV to a far-left edge of the die in the x-dimension. In addition to having an aligned placement, in some implementations, each of the TSV macros 120 and 140 have a same macro width. In other words, the macro width 122 of the TSV macro 120 is equal to the macro width 142 of the TSV 140. The placement of boundary cells, such as at least the boundary cells 150, in the TSV macro 140 while having the macro width 122 being equal to the macro width 142 provides a dense layout for the TSV macro 140. The dense layout of the TSV macro 140 maximizes the channel width usage between the function macros 130 and 132.

Each of the function macros 110, 112, 130 and 132 has boundary cells placed around them. For example, on sides aligned with the x-dimension, the boundary cells 150 are placed. On sides aligned with the y-dimension, the boundary cells 160 are placed. On corners, the boundary cells 170 are placed. Therefore, in various implementations, the boundary cells 150, 160 and 170 form a ring around each of the function macros 110, 112, 130 and 132. Each of the boundary cells 150, 160 and 170 provide no function, receive no signal connection, and contain no active devices. Therefore, although the boundary cells 150, 160 and 170 are in a standard cell library used for a design, the boundary cells 150, 160 and 170 are not part of a netlist for the design that includes the portion 100 of the floorplan. The boundary cells 150, 160 and 170 are used to improve semiconductor manufacturability and increase yield of the fabricated die.

Each of the boundary cells 150, 160 and 170 includes one or more fabrication structures such as one or more base layers and one or more metal layers. Examples of base layers are n-type or p-type diffusion well layer, dummy metal gate layer such as a polysilicon or other metal layer, and implant layer. The metal layers include a particular pattern of a metal layer of one or more of the metal layers. In some implementations, the boundary cells 150, 160 and 170 include a pattern in each of the available signal metal layers. The patterns of metal layers in the boundary cells 150, 160 and 170 fill empty areas of the floorplan to provide regular planarization of the resulting fabricated wafer.

In some implementations, the standard cell library includes multiple variations of each of the boundary cells 150, 160 and 170 with each variation having a different number of one or more layers than another variation. For example, the number of dummy metal gates can vary between the different standard cells, since the particular number depends on the location in the floorplan where the boundary cell is being instantiated. In some implementations, the boundary cells 150 placed adjacent to the function macros 110, 112, 130 and 132 have a different width than the boundary cells 150 placed adjacent to the TSV macro 120. In some implementations, one or more of the boundary cells 150, 160 and 170 include tap cells that are used to connect an n-type well to a power supply voltage and connect the silicon substrate to a ground reference voltage. In an implementation, one or more of the boundary cells 150, 160 and 170 include endcap cells that improve well and row alignment, and aid the later semiconductor fabrication process in using the correct laser wavelength.

Similar to the function macros 110, 112, 130 and 132, the TSV macro 120 is surrounded by the boundary cells 150, 160 and 170. The channel between the function macros 110 and 112 includes the distance 124 that is measured from the edge of the boundary cells 150 placed adjacent to the function macro 110 to the center of the TSV in the TSV macro 120. There is sufficient distance for the placement of the TSV macro 120 and the extra surrounding boundary cells 150. In other words, the distance 124 is equal to or greater than a threshold distance. However, in the channel between the function macros 130 and 132, the distance 144 is smaller than the distance 124 and smaller than the threshold distance. The distance 144 is measured from the edge of the boundary cells 150 placed adjacent to the function macro 130 to the center of the TSV in the TSV macro 140. The TSV macro 120 and the surrounding boundary cells 150 would not be able to be placed in this channel. No shifting along the x-dimension is possible, since the TSV macros placed in the channel are aligned to a particular dimension such as a requirement of a power grid.

In contrast to the function macros 110, 112, 130 and 132 and the TSV macro 120, the TSV macro 140 includes one or more of the boundary cells 150, 160 and 170 inside of it. In the illustrated implementation, the TSV macro 140 includes boundary cells 150 on each of a first side and a second side of the TSV block 144 along the x-dimension. Despite including the boundary cells 150, the TSV macro 140 has a macro width 142 that is equal to the macro width 122 of the TSV macro 120. A place and route tool determines that the TSV macro 140 is to be placed in the channel between the function macros 130 and 132, rather than the TSV macro 120. In some implementations, the place and route tool measures the distance 144, and determines the distance 144 is less than a threshold distance, and accordingly, selects the TSV macro 140. The place and route tool also prevents placement of boundary cells 150 adjacent to the TSV macro 140. In other words, the processor generates data indicative of a location in the floorplan where the boundary cell 150 adjacent to at least one side of the TSV macro 140 is not permitted. However, the place and route tool performs placement of the boundary cells 160 and 170 adjacent to the TSV macro 140 as is done for the function macros 110, 112, 130 and 132 and the TSV macro 120. The use of the TSV macro 140 allows placement of necessary boundary cells 150, 160 and 170, supports the power grid specification, and prevents any redesign in the floorplan to move the function macro 130.

Figure 2:
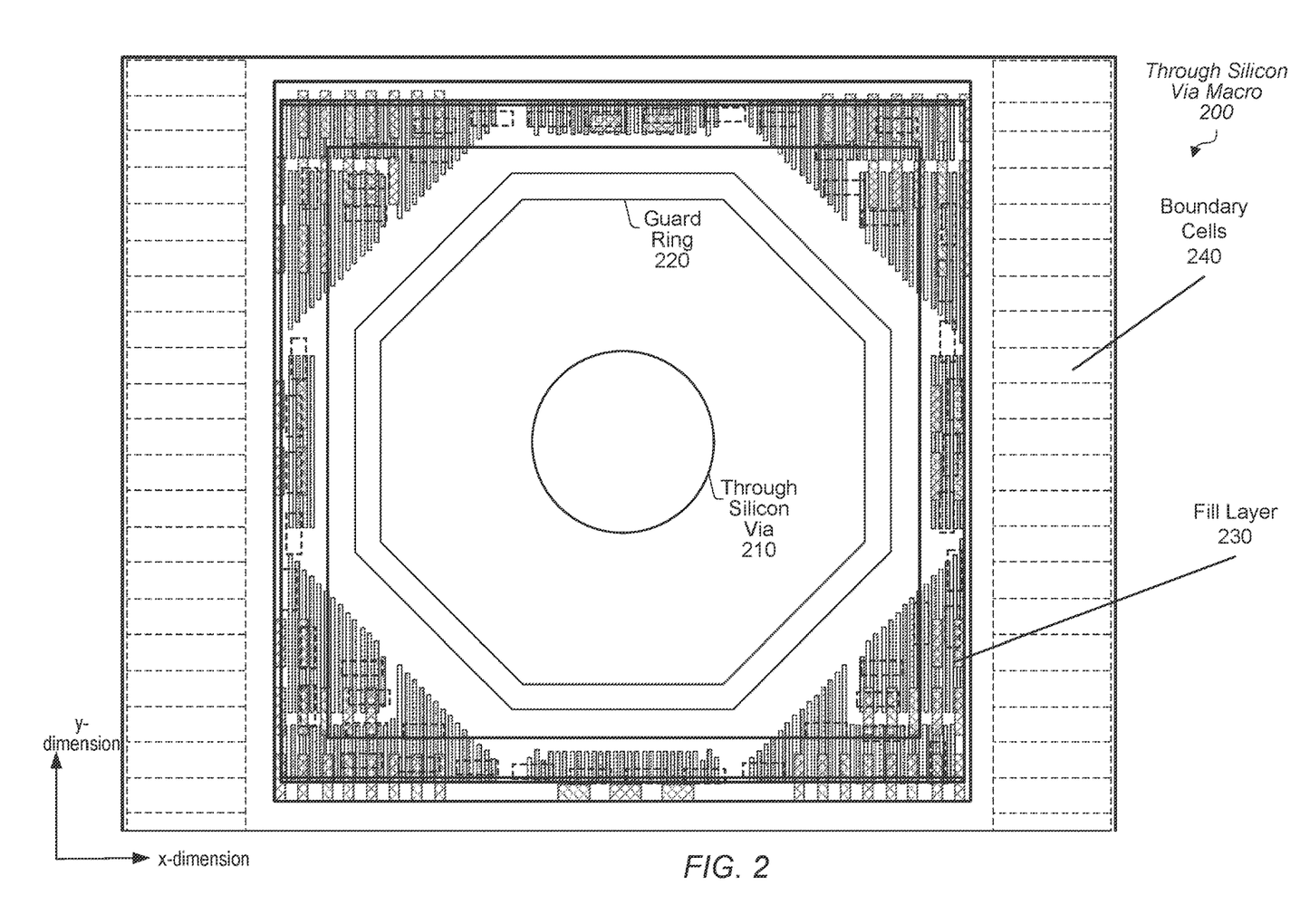
FIG. 2 is a generalized diagram of a through silicon via (TSV) macro.

Referring to FIG. 2, a generalized diagram is shown of a through silicon via (TSV) macro 200. The TSV macro 200 includes a TSV 210 and a guard ring 220. Boundary cells 240 are placed on each of a first side and a second side along a horizontal dimension, or an x-dimension. Between the boundary cells 240 and the guard ring 220 is fill layer 230. The boundary cells 240 include the same components as described earlier for the boundary cells 150, 160 and 170 (of FIG. 1). The boundary cells 240 include multiple instantiations of a boundary cell in the standard cell library. The TSV 210 indicates where a TSV is to be formed using one of a variety of conductive metals or metal alloys based on design requirements. The TSV transports data and control signals or power supply signals between dies of a 3D IC. The guard ring 220 indicates a keep out zone for the TSV 210. The empty space between the TSV 210 and the guard ring 220 is the keep out zone or region.

Similar to the boundary cells 240, each of the guard ring 220 and the fill layer 230 includes one or more fabrication structures such as one or more base layers and one or more metal layers. The choice of which base layers and metal layers to include in the guard ring 220 and the fill layer 230 is based on design choice. The boundary cells 240 and the fill layer 230 are used to provide an even distribution of metal layers across the die by including shapes in the metal layers in open regions. These shapes are not used to transport signals. The even distribution provides uniformity that aids the semiconductor fabrication process. For example, the addition of one or more metal layers that do not transport signals in the boundary cells 240 and the fill layer 230 reduce thickness variations during a chemical-mechanical polishing (CMP) fabrication step, and improve electro-chemical deposition (ECD), etching, and lithography steps as well as reduce stress effects across the die. The standard cell library includes one or more standard cells that are referred to as "fill cells" or "filler cells." These standard cells, or filler cells, in the library, are used to generate the fill layer 230. These filler cells are used to provide both front end of line (FEOL) fill and back end of line (BEOL) fill in the fill in the fill layer 230. In other words, the fill layer 230 shown in the TSV macro 200 includes one or more of these standard cells, or filler cells, from the standard cell library.

In addition to the uses of the boundary cells 240 and the fill layer 230, the guard ring 220 also defines the keep out zone for the TSV 210. In some implementations, the generation of the TSV macro 200 includes using one or more barriers. These barriers are not shown, since these barriers do not remain in the TSV macro 200. These barriers include shapes that do not transport signals in the metal layers that are also used in the filler cells of the fill layer 230. The purpose of the barriers is to ensure sufficient empty space between the fill layer 230 and the guard ring 220 when the fill layer 230 is formed in the TSV macro 200. In an implementation, a place and route tool automatically places the fill layer 230 between the boundary cells 240 and the guard ring 220. However, the placement of the boundary cells 240 reduces the amount of area for the fill layer 230.

The fill layer 230 has requirements for having a particular number of components such as at least a number of dummy metal gates. In order to satisfy the design rule check (DRC) requirements, the place and route tool places the fill layer 230 at an edge different from the far-left edge of the TSV macro 200 or the far-right edge of the TSV macro 200. In contrast to a TSV macro that has no boundary cells, each of the far-left edge and the far-right edge of the TSV macro 200 is occupied by the boundary cells 240. In some implementations, the guard ring 220 does not have sufficient metal layer shapes located at the outside edge to indicate to the place and route tool to finish forming the fill layer 230 a particular distance away from the guard ring 220. In such cases, a barrier is placed adjacent to a particular side of the guard ring 220 to indicate to the place and route tool to finish forming the fill layer 230 the particular distance away from particular side of the guard ring 220. One or more of the width and length of the barrier is adjusted until the placement (or formation) of the fill layer 230 provides the fill layer 230 a threshold distance from the guard ring 220. After the fill layer 230 is placed in the TSV macro 200 and satisfies the DRC requirements, the barrier is removed from the TSV macro 200. These steps of placing the barrier, adjusting width and length of the barrier, forming the fill layer 230, and removing the barrier are repeated for one or more other sides of the guard ring 220, if necessary.

Although boundary cells 240 are shown in the TSV macro 200 on each of the far-left side and the far-right side along an x-dimension, in other implementations, the TSV macro 200 includes boundary cells 240 on one or more of the top side and the bottom side along the y-dimension. In an implementation, the TSV macro 200 includes boundary cells 240 on each of the four sides in addition to each of the four corners. Any combination of placement of the boundary cells 240 in the TSV macro 200 is possible and contemplated. For each combination, the placement of the fill layer 230, and the use and subsequent removal of any barriers during the placement of the fill layer 230, are adjusted accordingly.

Once formed in a mask layout editor and after passing design rule check (DRC) verification), the TSV macro 200 is placed in a standard cell library. The TSV macro 200 is used to provide interconnections such as interconnections between power supply voltages between function macros on a die and bonding pads of the die. The TSV macro 200 is an example of a macro that does not include active devices, and accordingly, does not provide Boolean functionality. The TSV macro 200 of the standard cell library does include mask layout data. As described earlier, the mask layout data of a particular standard cell includes one or more mask layers associated with the one or more layers of the particular standard cell. The one or more layers of the particular standard cells include the base layers and the multiple metal layers used for signal interconnect. The mask layout data includes the mask patterns used in photolithography performed during semiconductor fabrication of integrated circuits. The patterns indicate the placement locations of components within the particular standard cell with respect to a reference point such as a certain corner of the particular standard cell. Examples of the components are active devices and passive elements (e.g., resistors, capacitors, inductors) placed in the standard cell. The mask layout data also includes the parasitic information of the components such as the resistance of wires and nodes, coupling capacitance of wires and transistor terminals, and load capacitance.

Figure 3:
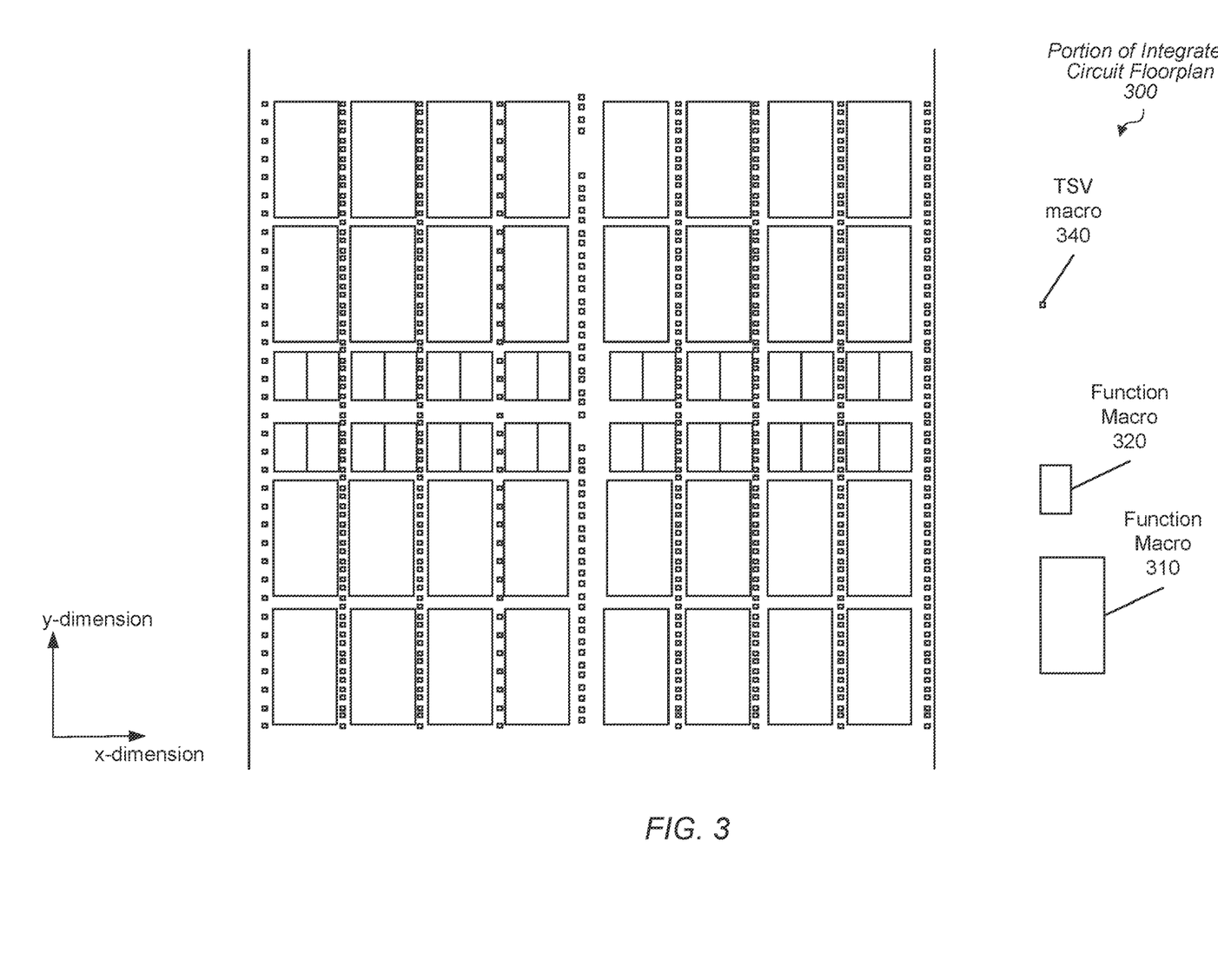
FIG. 3 is a generalized diagram of a portion of a floorplan.

Turning now to FIG. 3, a generalized diagram is shown of a portion 300 of an integrated circuit floorplan. The portion 300 of the integrated circuit floorplan (or floorplan) includes function macros 310 and 320 instantiated multiple times across the die. The portion 300 of the floorplan also includes TSV macros 340. Although not shown, boundary cells are placed around the function macros 310 and 320. In an implementation, the TSV macros 340 provide a power supply voltage or a ground reference voltage to one or more of the function macros 310 and 320 and any surrounding logic gates (not shown).

In various implementations, one or more of the TSVs 340 include the components of the TSV macro 140 (of FIG. 1) and the TSV macro 200 (of FIG. 2). In some implementations, the use these types of TSV macros supports smaller channel widths between the function macros 310 than if other types of TSV macros are used. Additionally, in an implementation, the use of these types of TSV macros allows Boolean logic gates, data buffers, and other types of standard cells to be placed between a TSV macro 340 and a nearby function macro 310. The TSV macros 340 are aligned with one another in the y-dimension within a channel between function macros 310 and a channel between function macros 320. In some implementations, the alignment is based on a predetermined power grid.

In some implementations, each of the function macros 310 is an instantiation of a same function macro. Accordingly, each of the function macros 310 provides a same functionality. In an implementation, each of the function macros 310 is a memory macro that includes static random access memory cells arranged in rows and columns. In such implementations, the function macros 320 include access circuitry such as one or more of read word line drivers, write word line drivers, readout storage latches or registers, write data storage latches or registers, and so on. In other implementations, the function macros 310 and 320 provide other functionality.

Figure 4:
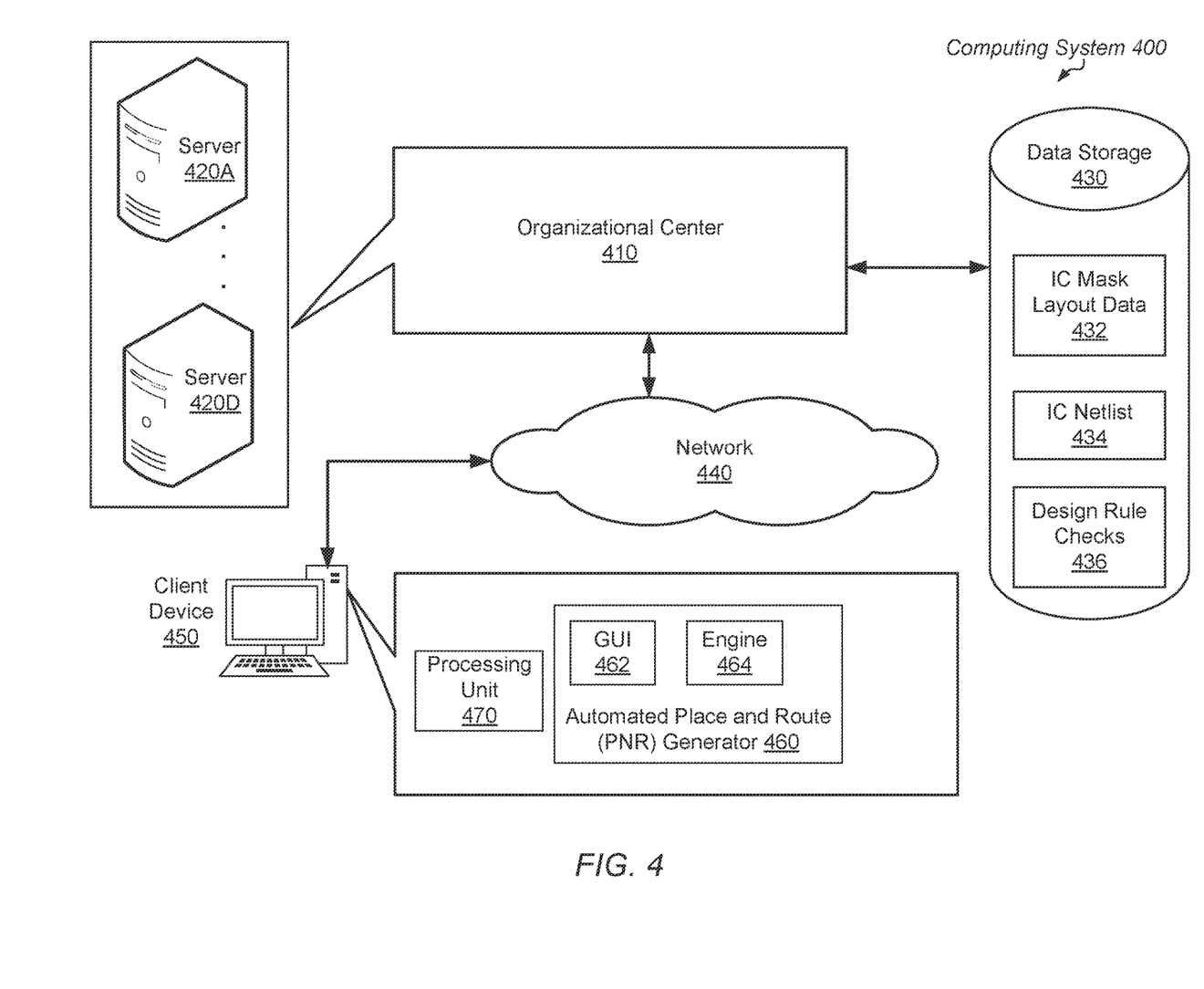
FIG. 4 is a generalized diagram of a computing system.

Referring to FIG. 4, a generalized block diagram of a computing system 400 is shown. In the illustrated implementation, the computing system 400 includes the client computing device 450, the servers 420A-420D that include hardware for executing software and supporting the organizational center 410, a network 440, and the data storage 430 that includes one or more data stores supported and used by the organizational center 410. Although a single client computing device 450 is shown, any number of client computing devices utilize the organizational center 410 through the network 440. The client computing device 450, which is also referred to as client device 450, includes hardware, such as circuitry of a processor, to execute instructions of the automated place and route (PNR) generator 460. The automated PNR generator 460 (or PNR generator 460) uses a copy of data stored in the data storage 430. Examples of the copy of data are the integrated circuit (IC) mask layout data 432 and the IC netlist 434.

The IC mask layout data 432 is available in a standard cell library that includes a variety of cells using devices of varying sizes to provide particular functionality. The IC mask layout data 432 also includes mask layout data of macros. As described earlier, the IC mask layout data 432 of a particular standard cell includes one or more mask layers associated with the one or more layers of the particular standard cell. The one or more layers of the particular standard cells include the base layers and the multiple metal layers used for signal interconnect. The mask layout data includes the mask patterns used in photolithography performed during semiconductor fabrication of integrated circuits. The patterns indicate the placement locations of components within the particular standard cell with respect to a reference point such as a certain corner of the particular standard cell. Examples of the components are active devices and passive elements (e.g., resistors, capacitors, inductors) placed in the standard cell. The IC mask layout data 432 also includes the parasitic information of the components such as the resistance of wires and nodes, coupling capacitance of wires and transistor terminals, and load capacitance.

In an implementation, the user initiates use of the PNR generator 460 using the graphical user interface (GUI) 462, a script, a command line, or a combination of these elements. The PNR generator 460 generates a representation of the hardware layout from schematics of the integrated circuit being designed. To do so, the PNR generator 460 additionally uses copies of the mask layout data 432 and the RDL netlist 434 as well specifications of dimensions of a floorplan of the IC to identify the placement of standard cells and macros in the floorplan of the IC die being designed.

The PNR generator 460 also uses the DRCs 436 to verify that the placement of the standard cells, macros, boundary cells and fill layers does not violate design rules for layout. The output of the PNR generator 460 is later sent to a semiconductor wafer manufacturer. This output indicates the placement and connectivity of components across the die of the IC being designed. This output uses one or more TSV macros that include one or more boundary cells. Examples of these TSV macros are the TSV macro 140 (of FIG. 1) and the TSV macro 200 (of FIG. 2). If the placement of the standard cells, macros, boundary cells and fill layers pass the DRC and LVS checks, then one or more copies of an updated version of the mask layout data 432 are stored at the client device 450 and the data storage 430. Following, a semiconductor chip tape out process is performed for the integrated circuit being developed, and a semiconductor fabrication process provides hardware of the integrated circuit to test.

The client device 450 includes a desktop computer or a mobile computing device such as a laptop, a tablet computer, and so forth. The client device 450 includes hardware circuitry such as a processing unit 470 for processing instructions of computer programs. In some implementations, the processing unit 470 includes one or more homogeneous cores of a processor. In other implementations, the processing unit includes heterogeneous cores such as a parallel processing architected core and a general-purpose core as used in central processing units (CPUs). The parallel architected core can be a graphics processing unit (GPU), a digital signal processing unit (DSP) or other.

The client device 450 includes a network interface (not shown) supporting one or more communication protocols for data and message transfers through the network 440. The network 440 includes multiple switches, routers, cables, wireless transmitters and the Internet for transferring messages and data. Accordingly, the network interfaces of the organizational center 410 and the client device 450 support at least the Hypertext Transfer Protocol (HTTP) for communication across the World Wide Web. In addition to communicating with the client device 450 through the network 440, the organizational center 410 also communicates with the data storage 430 for storing and retrieving data.

In various implementations, the organizational center 410 is an infrastructure for a vendor producing one or more hardware products. The organizational center 410 includes an intranet network providing a private network accessible only to an organization's staff. An intranet portal is used to provide access to resources with a user-friendly interface such as graphical user interfaces (GUIs) and dashboards. The information and services made available by the organizational center 410 is unavailable to the general public through direct access. Through user authentication, the staff members are able to access resources through the organizational center 410 to communicate with other staff members, collaborate on projects and monitor product development, update products, documents and tools stored in a centralized repository and so forth.

The servers 420A-420D used for supporting the organizational center 410 and resources accessed through the organizational center 410 include a variety of server types such as database servers, computing servers, application servers, file servers, mail servers and so on. In various implementations, the servers 420A-420D and the client device 450 operate with a client-server architectural model. The client device 450 includes a copy of a particular version of a given software product or tool such as the PNR generator 460. In some implementations, the version of the PNR generator 460 is based on at least the operating system and the processor(s) used by the client device 450. The PNR generator 460 includes an engine 464 that when executed by a processor of the processing unit 470, causes the processing unit 470 to automatically generate layout masks for components across the die of the IC being designed according to a particular floorplan.

Figure 5:
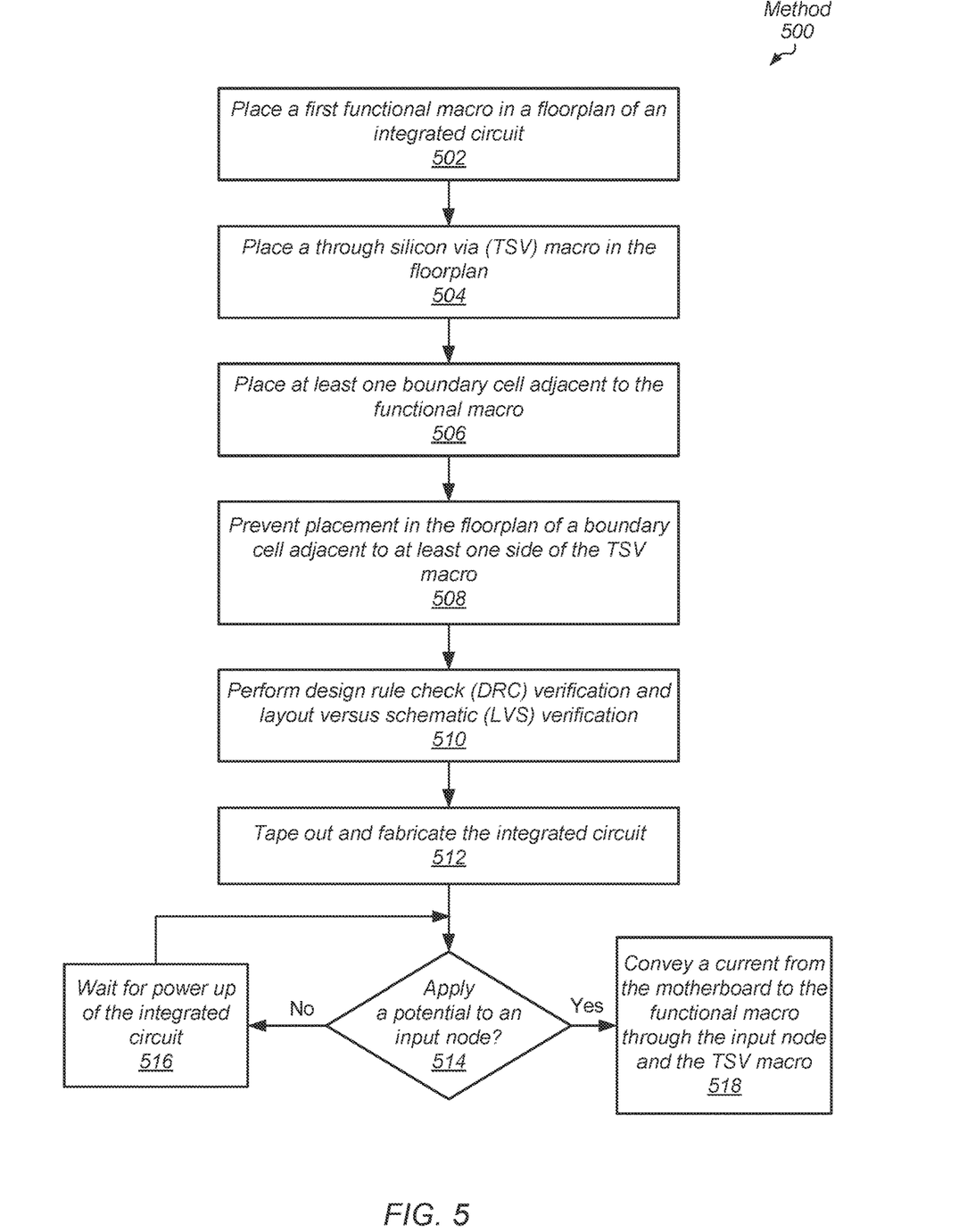
FIG. 5 is a generalized diagram of a method for efficiently creating a floorplan layout using an efficient through silicon via macro block.

Referring to FIG. 5, a generalized diagram is shown of a method 500 for efficiently creating a floorplan layout using an efficient through silicon via macro block. For purposes of discussion, the steps in this implementation (as well as in FIGS. 6-7) are shown in sequential order. However, in other implementations some steps occur in a different order than shown, some steps are performed concurrently, some steps are combined with other steps, and some steps are absent.

The hardware of a processor of a corresponding computing device executes an automatic place and route (PNR) tool or generator. The PNR tool (based on execution of the hardware of the processor) selects a netlist of an IC being designed, accesses specifications of dimensions of a floorplan of the IC, and accesses a standard cell library. The PNR generator places a first functional macro in a floorplan of an integrated circuit (block 502). The PNR generator places a through silicon via (TSV) macro in the floorplan (block 504). The PNR generator places at least one boundary cell adjacent to the functional macro (block 506). The PNR generator prevents placement in the floorplan of a boundary cell adjacent to at least one side of the TSV macro (block 508). In other words, the PNR generator generates data indicative of a location in the floorplan where the boundary cell adjacent to at least one side of the TSV macro is not permitted. The PNR generator performs design rule check (DRC) verification and layout versus schematic (LVS) verification (block 510). Any errors are corrected by designers. Once the verifications are performed error-free, the IC design is taped out and fabricated (block 512).

If an electric potential is not applied to a first node of an integrated circuit in the semiconductor package ("no" branch of the conditional block 514), then the semiconductor package waits for power up (block 516). However, if a potential is applied to the first node, which creates a potential difference ("yes" branch of the conditional block 514), then the input node, convey a current from the motherboard to a functional macro (block 518).

Figure 6:
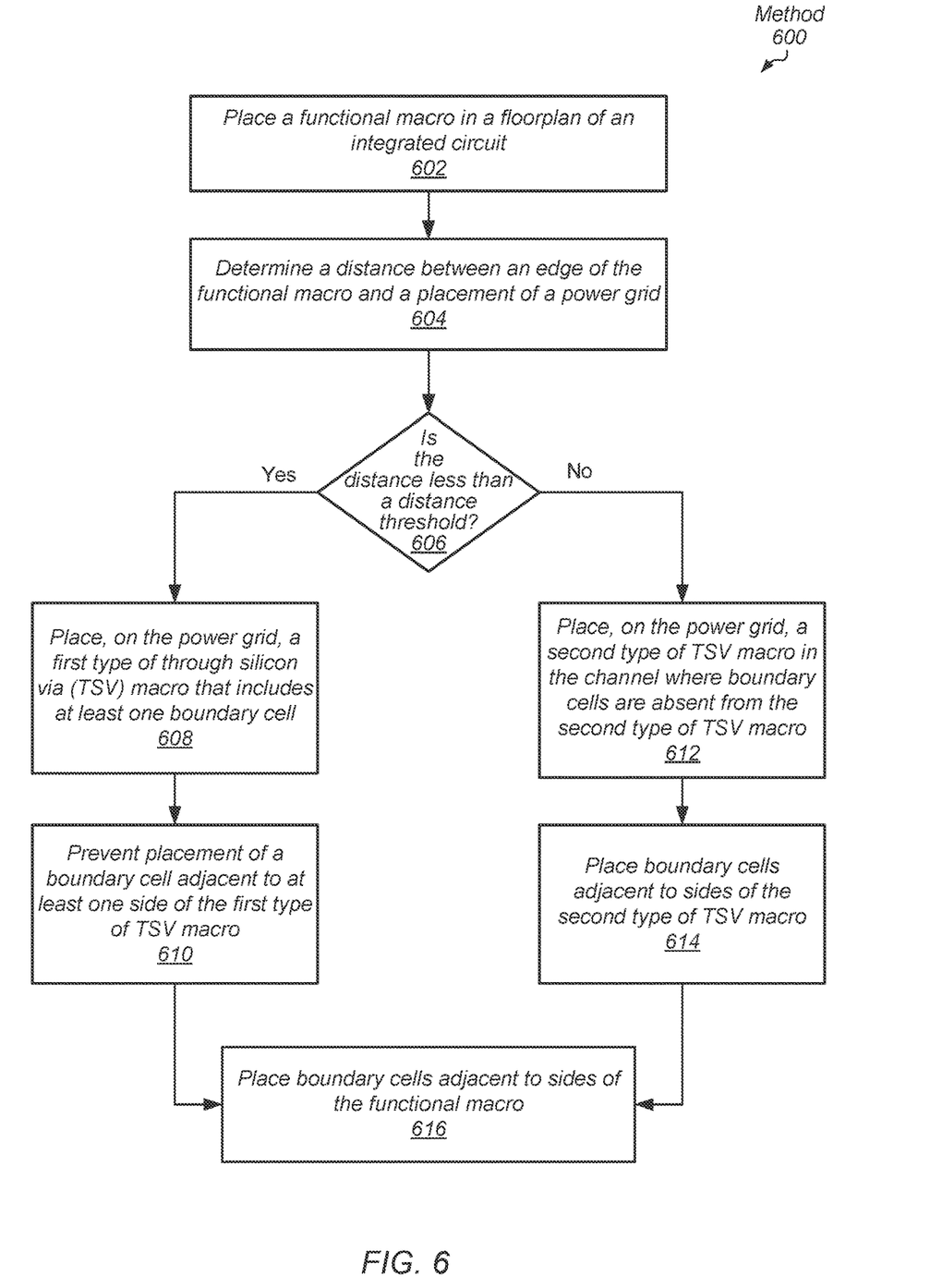
FIG. 6 is a generalized diagram of a method for efficiently creating a floorplan layout using an efficient through silicon via macro block.

Turning now to FIG. 6, a generalized diagram is shown of a method 600 for efficiently creating a floorplan layout using an efficient through silicon via macro block. The hardware of a processor of a corresponding computing device executes an automatic place and route (PNR) tool or generator. The PNR tool (based on execution of the hardware of the processor) selects a netlist of an IC being designed, accesses specifications of dimensions of a floorplan of the IC, and accesses a standard cell library. The PNR tool places a functional macro in a floorplan of an integrated circuit (block 602). The PNR tool determines a distance between an edge of the functional macro and a placement of a power grid (block 604). The PNR tool compares the measured distance to a distance threshold. The distance threshold includes a minimum distance that supports placement of boundary cells adjacent to the side of the functional macro facing the power grid, placement of boundary cells adjacent to a side of a TSV macro facing the functional macro, and a distance from the side of the TSV macro facing the functional macro to the center of the TSV macro.

If the PNR tool determines that the measured distance is less than the distance threshold ("yes" branch of the conditional block 606), then the PNR tool places, on the power grid, a first type of through silicon via (TSV) macro that includes at least one boundary cell (block 608). Examples of this first type of TSV macro are the TSV macro 140 (of FIG. 1) and the TSV macro 200 (of FIG. 2). The PNR tool prevents placement of a boundary cell adjacent to at least one side of the first type of TSV macro (block 610). If the PNR tool determines that the measured distance is equal to or greater than the distance threshold ("no" branch of the conditional block 606), then the PNR tool places, on the power grid, a second type of TSV macro in the channel where boundary cells are absent from the second type of TSV macro (block 612). Following, the PNR tool places boundary cells adjacent to sides of the second type of TSV macro (block 614). Regardless of the comparison between the measured distance and the threshold distance, the PNR tool places boundary cells adjacent to sides of the functional macro (block 616).

Figure 7:
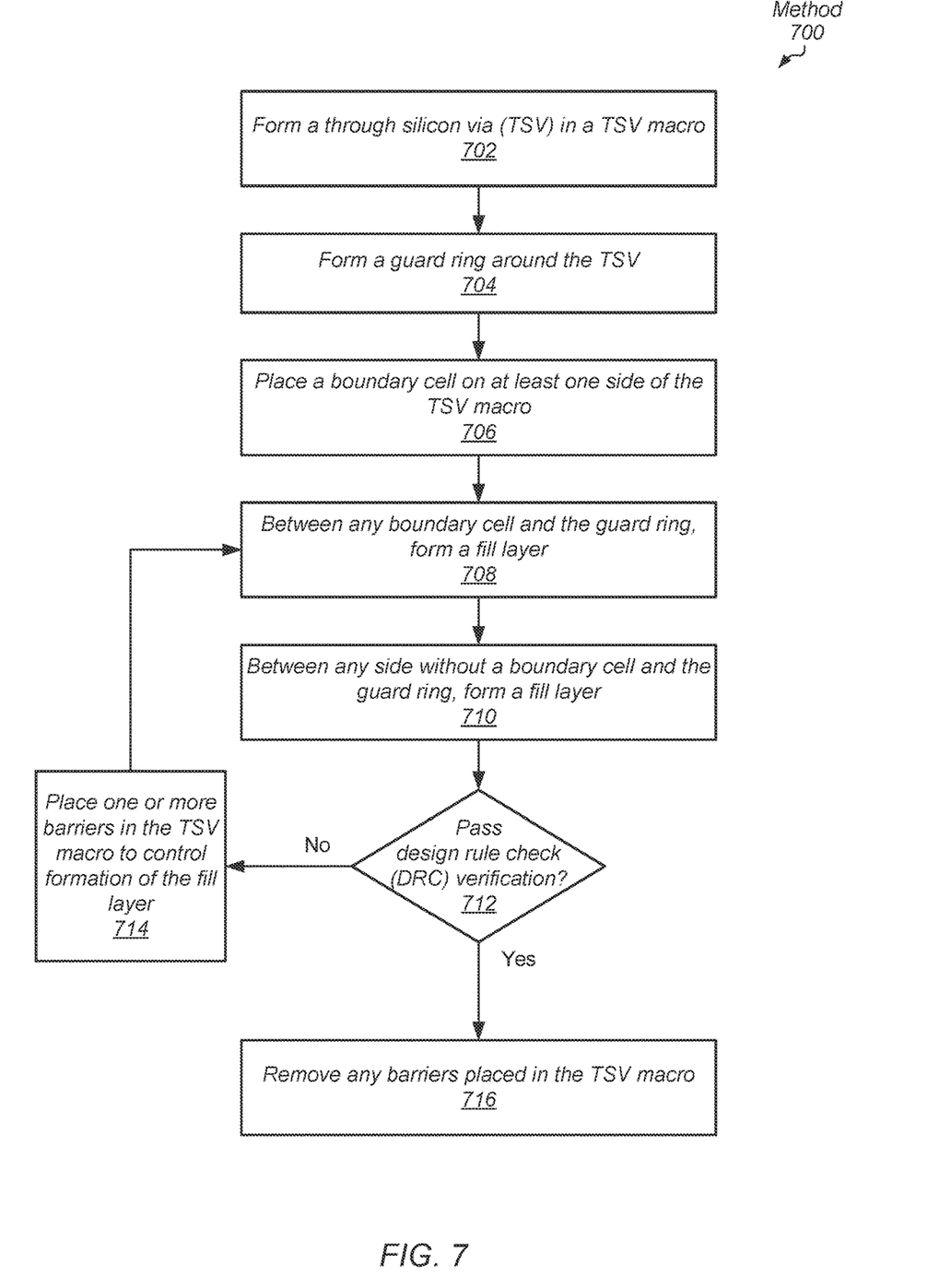
FIG. 7 is a generalized diagram of a method for efficiently designing a through silicon via macro block.

Referring to FIG. 7, a generalized diagram is shown of a method 700 for efficiently designing a through silicon via macro block. The hardware of a processor of a corresponding computing device executes a mask layout editor tool (or editor tool). The editor tool forms a through silicon via (TSV) in a TSV macro (block 702). The editor tool forms a guard ring around the TSV (block 704). The editor tool places a boundary cell on at least one side of the TSV macro (block 706). Between any boundary cell and the guard ring, the editor tool forms a fill layer (block 708). Between any side without a boundary cell and the guard ring, the editor tool forms a fill layer (block 710).

The editor tool runs DRC verification on the TSV macro. If the TSV macro does not pass the DRC verification ("no" branch of the conditional block 712), then the editor tool places one or more barriers in the TSV macro to control formation of the fill layer (block 714). As described earlier, these barriers include shapes that do not transport signals in the metal layers that are also used in the filler cells of the fill layer. The purpose of the barriers is to ensure sufficient empty space between the fill layer and the guard ring when the fill layer is formed in the TSV macro. Afterward, control flow of method 700 returns to block 708 where the editor tool forms a fill layer. In some implementations, the editor tool removes a portion or all of the fill layer that was previously formed. If the TSV macro passes the DRC verification ("yes" branch of the conditional block 712), then the barriers are removed from the TSV macro (block 716). The TSV macro is ready for use in an integrated circuit floorplan. In some implementations, the TSV macro is placed in a standard cell library.

Figure 8:
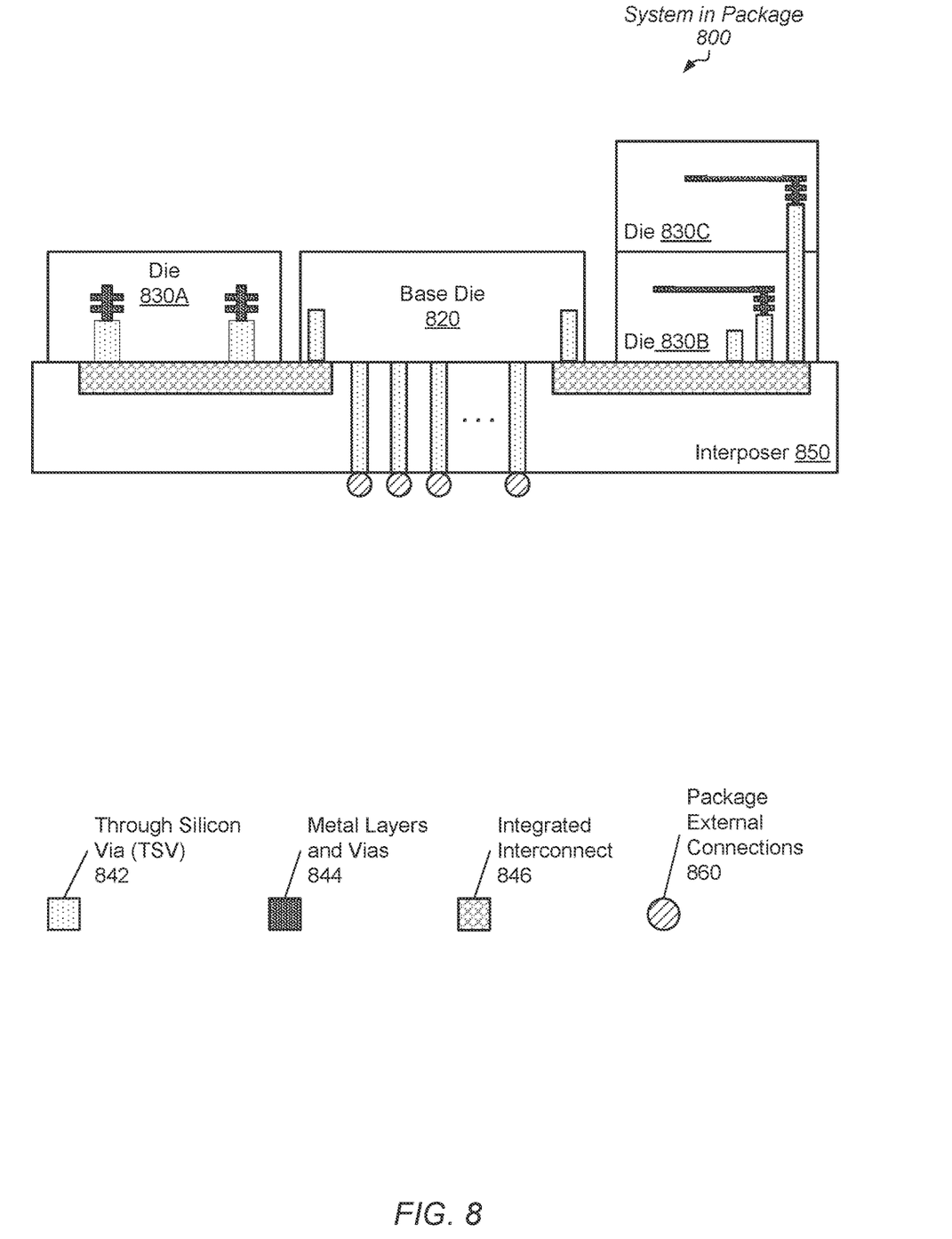
FIG. 8 is a generalized diagram of a system in a package (SiP).

Turning now to FIG. 8, a generalized diagram is shown of a system-in-package (SiP) 800. In various implementations, three-dimensional (3D) packaging is used within a computing system to create the SiP 800. The SiP 800 includes the semiconductor base die 820 (or die 820) and the semiconductor dies 830A-830C (or dies 830A-830C). Here, the SiP 800 also uses layers of active electronic components integrated both horizontally and vertically into a single circuit. Die-stacking technology is a fabrication process that enables the physical stacking of multiple separate pieces of silicon (integrated chips) together in a same package with high-bandwidth and low-latency interconnects. The SiP 800 includes additional components not shown for ease of illustration such as one or more of an interposer, a package substrate, a redistribution layer (RDL), bonding pads, and so forth. Although four dies 820 and 830A-830C are shown, any number of dies, any number of types of dies, and any order of vertical stacking is used in other implementations.

As shown, in one implementation, the SiP 800 includes the die 830C stacked on top of the die 830B. In other words, the die 830C is placed on a side of the die 820B away from the printed circuit board (not shown), such as a motherboard, located below the package external connections 860. In this configuration, the die 830C and the die 830B use through silicon vias (TSVs) 842 between them for transferring data signals, control signals, and power supply signals. A printed circuit board (not shown) is located below the SiP 800 and communicates with the base die 820 through the package external connections 860. In various implementations, the package external connections 860 are one of a variety of surface mount device (SMD) pins that allow the SiP 800 to be placed directly onto the surface of the printed circuit board or placed directly on a redistribution layer (RDL), if a RDL is used. Examples of the SMD pins are solder ball grid arrays (BGAs), bumps or micro bumps, flat contacts or bonding pads, and so forth.

It is contemplated that the base die 820 and the dies 830A-830C include one or more of a variety of processing units, a cache memory subsystem, data storage arrays, one or more of a variety of application specific integrated circuits (ASICs), a display controller, a communication interconnect or fabric, and so on. For example, one or more of the base die 820 and the dies 830A-830C is a system on a chip (SoC). Multiple routes use vertical hops between the base die 820 and the dies 830A-830C. These routes include signal routes such as commands and messages and packets, address information, response data, write data, data snoop requests, and so on. The routes also include power connection routes such as one or more power supply lines for conveying power supply voltage levels and ground reference voltage levels. In addition to using the TSVs 842, the SiP 800 also uses the in-package horizontal, low-latency integrated interconnect 846 (or interconnect 846), which provides reduced lengths of interconnect signals versus long off-chip interconnects. The interconnect 846 uses particular signals and protocols as if the chips, such as the base die 820 and dies 830A-830C were mounted in separate packages on a circuit board.

The active device layer of each of base die 820 and the dies 830A-830C have direct vertical interconnects tunneling, or otherwise traversing, through them such as the TSVs 842. The TSVs 842 are an alternative interconnect to wirebond and flip chips. A corresponding keep out zone for an individual TSV of the TSVs 842 defines an area around the TSV providing a predicted stress to an active device to be above a threshold. The stress is caused by the placement of the TSV. Areas outside of the keep out zone provide a predicted stress to an active device to be below the threshold. The size and density of the TSVs that can tunnel between the different device layers varies based on the underlying technology used to fabricate the 3D ICs.

In some implementations, the base die 820 and the dies 830A-830C do not include each TSV tunneling entirely through each of them to transport signals between them and other dies. Rather, one or more TSVs tunnels through a silicon substrate and oxide layers and ends at a particular metal layer within the base die 820 and the dies 830A-830C. The metal layers can be any of the metal layers from the lowest metal zero (M0) layer to the highest metal layer used by a particular die. In some implementations, a particular TSV reaches the upper metal layers and goes no farther. Therefore, no active devices (transistors) are formed where this particular TSV is formed. In various implementations, the placement of the TSVs 842 on the floorplans of the base die 820 and the dies 830A-830C use the techniques described earlier regarding the TSV macro 140 (of FIG. 1) and the TSV macro 200 (of FIG. 2).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
    circuitry configured to generate, based at least in part on a netlist corresponding to an integrated circuit and a standard cell library, data indicative of:
        a placement in a floorplan of the integrated circuit of:
            a first type of through silicon via (TSV) macro;
            a functional macro comprising a plurality of active devices; and
            at least one boundary cell adjacent to the functional macro, wherein the boundary cell comprises one or more fabrication structures other than active devices including at least one or more base layers and one or more metal layers foregoing any connection to a power supply; and
        locations in the floorplan of the integrated circuit where a boundary cell adjacent to at least a first side of the first type of TSV macro is not permitted.

2. The processor as recited in claim 1, wherein the first type of TSV macro comprises at least one boundary cell.

3. The processor as recited in claim 2, wherein the circuitry is further configured to generate, based at least in part on the netlist and the standard cell library, data indicative of locations in the floorplan of the integrated circuit where a boundary cell adjacent to a second side different from the first side of the first type of TSV macro is not permitted.

4. The processor as recited in claim 3, wherein the first type of TSV macro comprises a first boundary cell on the first side and a second boundary cell on the second side.

5. The processor as recited in claim 1, wherein the first type of TSV macro includes a threshold distance between a fill layer and a guard ring.

6. The processor as recited in claim 1, wherein the circuitry is further configured to:
    determine a distance between an edge of the functional macro and a placement of a power grid; and
    generate, based at least in part on the netlist and the standard cell library, data indicative of a placement in the floorplan of the integrated circuit of:
        the first type of TSV macro on the power grid, responsive to determining that the distance is less than a threshold distance.

7. The processor as recited in claim 6, wherein the circuitry is further configured to generate, based at least in part on the netlist and the standard cell library, data indicative of a placement in the floorplan of the integrated circuit of:
    a second type of TSV macro different from the first type of TSV macro on the power grid, responsive to determining that the distance is equal to or greater than the threshold distance, wherein boundary cells are absent from the second type of TSV macro; and
    at least one boundary cell adjacent to the second type of TSV macro.

8. A method comprising:
    receiving, by circuitry of a processor, a netlist of an integrated circuit;
    accessing, by the circuitry, a standard cell library comprising a plurality of standard cells and a plurality of macros; and
    generating, by the circuitry, based at least in part on the netlist and the standard cell library, data indicative of:
        a placement in a floorplan of the integrated circuit of:
            a first type of through silicon via (TSV) macro;
            a functional macro comprising a plurality of active devices; and
            at least one boundary cell adjacent to the functional macro, wherein the boundary cell comprises one or more fabrication structures other than active devices including at least one or more base layers and one or more metal layers foregoing any connection to a power supply; and
        locations in the floorplan of the integrated circuit where a boundary cell adjacent to at least a first side of the first type of TSV macro is not permitted.

9. The method as recited in claim 8, wherein the first type of TSV macro comprises at least one boundary cell.

10. The method as recited in claim 9, further comprising generating, by the circuitry, based at least in part on the netlist and the standard cell library, data indicative of locations in the floorplan of the integrated circuit where a boundary cell adjacent to a second side different from the first side of the first type of TSV macro is not permitted.

11. The method as recited in claim 10, wherein the first type of TSV macro comprises a first boundary cell on the first side and a second boundary cell on the second side.

12. The method as recited in claim 8, wherein the first type of TSV macro includes a threshold distance between a fill layer and a guard ring.

13. The method as recited in claim 8, further comprising:
determining, by the circuitry, a distance between an edge of the functional macro and a placement of a power grid; and
generating, by the circuitry based at least in part on the netlist and the standard cell library, data indicative of a placement in the floorplan of the integrated circuit of:
the first type of TSV macro on the power grid, responsive to determining that the distance is less than a threshold distance.

14. The method as recited in claim 13, further comprising generating, by the circuitry based at least in part on the netlist and the standard cell library, data indicative of a placement in the floorplan of the integrated circuit of:
a second type of TSV macro different from the first type of TSV macro on the power grid, responsive to determining that the distance is equal to or greater than a threshold distance, wherein boundary cells are absent from the second type of TSV macro; and
at least one boundary cell adjacent to the second type of TSV macro.

15. A computing system comprising:
a processing unit;
a memory coupled to the processing unit, wherein the memory is configured to store:
a netlist of an integrated circuit; and
a standard cell library comprising a plurality of standard cells and a plurality of macros; and
wherein circuitry of the processing unit is configured to:
receive the netlist;
access the standard cell library; and
generate, based at least in part on the netlist and the standard cell library, data indicative of:
a placement in a floorplan of the integrated circuit of:
a first type of through silicon via (TSV) macro;
a functional macro comprising a plurality of active devices; and
at least one boundary cell adjacent to the functional macro; and
at least one location in the floorplan of the integrated circuit where a boundary cell is intentionally omitted adjacent to at least a first side of the first type of TSV macro, despite a presence of available space for the boundary cell and an absence of any design rule prohibiting placement on that side.

16. The computing system as recited in claim 15, wherein the first type of TSV macro comprises at least one boundary cell.

17. The computing system as recited in claim 16, wherein the circuitry is further configured to generate, based at least in part on the netlist and the standard cell library, data indicative of locations in the floorplan of the integrated circuit where a boundary cell adjacent to a second side different from the first side of the first type of TSV macro is not permitted.

18. The computing system as recited in claim 17, wherein the first type of TSV macro comprises a first boundary cell on the first side and a second boundary cell on the second side.

19. The computing system as recited in claim 15, wherein the first type of TSV macro includes a threshold distance between a fill layer and a guard ring.

20. The computing system as recited in claim 15, wherein the circuitry is further configured to:
determine a distance between an edge of the functional macro and a placement of a power grid; and
generate, based at least in part on the netlist and the standard cell library, data indicative of a placement in the floorplan of the integrated circuit of:
the first type of TSV macro on the power grid, responsive to determining that the distance is less than a threshold distance.

* * * * *